United States Patent
Lee

(10) Patent No.: US 11,749,868 B2
(45) Date of Patent: Sep. 5, 2023

(54) SEPARATOR INCLUDING POROUS COATING LAYER CONTAINING ADDITIVE THAT OCCLUDES LITHIUM IONS, AND LITHIUM SECONDARY BATTERY COMPRISING THE SAME

(71) Applicant: LG CHEM, LTD., Seoul (KR)

(72) Inventor: Jeongbeom Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 270 days.

(21) Appl. No.: 16/759,068

(22) PCT Filed: May 17, 2019

(86) PCT No.: PCT/KR2019/006014
§ 371 (c)(1),
(2) Date: Apr. 24, 2020

(87) PCT Pub. No.: WO2019/245170
PCT Pub. Date: Dec. 26, 2019

(65) Prior Publication Data
US 2021/0175582 A1  Jun. 10, 2021

(30) Foreign Application Priority Data

Jun. 22, 2018 (KR) ........................ 10-2018-0072319
May 16, 2019 (KR) ........................ 10-2019-0057611

(51) Int. Cl.
| | |
|---|---|
| H01M 50/414 | (2021.01) |
| H01M 50/446 | (2021.01) |
| H01M 50/451 | (2021.01) |
| H01M 10/0525 | (2010.01) |
| H01M 10/42 | (2006.01) |
| H01M 50/454 | (2021.01) |
| H01M 50/457 | (2021.01) |
| H01M 50/491 | (2021.01) |

(52) U.S. Cl.
CPC ..... *H01M 50/414* (2021.01); *H01M 10/0525* (2013.01); *H01M 10/4235* (2013.01); *H01M 50/446* (2021.01); *H01M 50/451* (2021.01); *H01M 50/454* (2021.01); *H01M 50/457* (2021.01); *H01M 50/491* (2021.01)

(58) Field of Classification Search
CPC ............. H01M 50/451; H01M 50/414; H01M 50/446; H01M 10/0525; H01M 10/4235
USPC ........ 429/144, 145, 248, 249, 252, 253, 254
See application file for complete search history.

(56) References Cited

U.S. PATENT DOCUMENTS

| 8,481,195 | B1 * | 7/2013 | Liu | ................... H01M 50/434 |
| | | | | 429/188 |
| 9,252,455 | B1 * | 2/2016 | Liu | ................... H01M 50/434 |
| 2007/0202411 | A1 | 8/2007 | Kim et al. | |
| 2010/0261069 | A1 | 10/2010 | Nakura | |
| 2014/0120402 | A1 | 5/2014 | Yu et al. | |
| 2014/0205883 | A1 * | 7/2014 | Wang | .................... H01M 4/623 |
| | | | | 429/144 |
| 2015/0050541 | A1 * | 2/2015 | Kinoshita | ........... H01M 50/423 |
| | | | | 429/144 |
| 2016/0049628 | A1 | 2/2016 | Kim et al. | |
| 2019/0112453 | A1 | 4/2019 | Kim et al. | |

FOREIGN PATENT DOCUMENTS

| CN | 103718336 A | | 4/2014 | |
| CN | 203631633 U | * | 6/2014 | |
| CN | 203631634 U | * | 6/2014 | |
| CN | 203631635 U | * | 6/2014 | |
| CN | 203631636 U | * | 6/2014 | |
| CN | 203746937 U | * | 7/2014 | |
| CN | 203746950 U | * | 7/2014 | |
| CN | 103999280 A | | 8/2014 | |
| CN | 206098515 U | * | 4/2017 | |
| CN | 206116494 U | * | 4/2017 | |
| CN | 107342387 A | * | 11/2017 | ........ H01M 10/0525 |
| JP | 2009-146822 A | | 7/2009 | |
| JP | 2014154220 A | * | 8/2014 | |
| JP | 2016-181357 A | | 10/2016 | |
| KR | 10-2007-0082892 A | | 8/2007 | |
| KR | 10-2012-0103948 A | | 9/2012 | |
| KR | 10-2013-0022395 A | | 3/2013 | |
| KR | 10-2013-0136149 A | | 12/2013 | |
| KR | 10-2014-0082261 A | | 7/2014 | |
| KR | 10-2014-0083181 A | | 7/2014 | |
| KR | 10-2014-0096522 A | | 8/2014 | |
| KR | 10-2015-0050498 A | | 5/2015 | |
| KR | 10-2016-0028828 A | | 3/2016 | |
| KR | 10-2017-0009534 A | | 1/2017 | |
| KR | 10-2017-0127721 A | | 11/2017 | |
| WO | 2017/122359 A1 | | 7/2017 | |
| WO | WO-2017122359 A1 | * | 7/2017 | |

OTHER PUBLICATIONS

International Search Report (with partial translation) and Written Opinion dated Aug. 29, 2019, issued in corresponding International Patent Application No. PCT/KR2019/006014.
Extended European Search Report issued from the European Patent Office dated Dec. 22, 2020 in a corresponding European Patent Application No. 19822498.2.

* cited by examiner

*Primary Examiner* — Sean P Cullen

(74) *Attorney, Agent, or Firm* — Morgan, Lewis & Bockius LLP

(57) ABSTRACT

The present invention relates to a separator capable of inhibiting the growth of lithium dendrites, and a lithium secondary battery including the same. According to the present invention, the stability and life cycle characteristic of a lithium secondary battery can be remarkably improved.

18 Claims, No Drawings

SEPARATOR INCLUDING POROUS COATING LAYER CONTAINING ADDITIVE THAT OCCLUDES LITHIUM IONS, AND LITHIUM SECONDARY BATTERY COMPRISING THE SAME

CROSS-REFERENCE TO RELATED APPLICATION

This application claims the benefit of Korean Patent Application No. 10-2018-0072319 filed on Jun. 22, 2018 and Korean Patent Application No. 10-2019-0057611 filed on May 16, 2019 with the Korean Intellectual Property Office, the disclosures of which are herein incorporated by reference in their entirety.

TECHNICAL FIELD

The present invention relates to a separator capable of inhibiting the growth of lithium dendrites, and a lithium secondary battery including the same.

BACKGROUND ART

With the rapid development of electric, electronic, communication, and computer industries, the demand for high capacity batteries is increasing more and more. In order to fulfill such a requirement, lithium metal secondary batteries using lithium metal or a lithium alloy as a negative electrode having high energy density are receiving attention.

A lithium metal secondary battery is a secondary battery using lithium metal or a lithium alloy as a negative electrode. Since lithium metal has low density of 0.54 g/cm$^3$ and a very low standard reduction potential of −3.045 V (SHE: based on standard hydrogen electrode), it is receiving the most attention as the electrode material of a high energy density battery.

Such a lithium metal secondary battery, unlike the existing lithium ion secondary battery, is charged with plating of lithium metal on a negative electrode, and discharged with the stripping of lithium metal, lithium dendrites may grow in the negative electrode. In case lithium dendrites grow, a separator interposed between a positive electrode and a negative electrode may be damaged and an internal short circuit may be caused, which may lead to ignition. Thus, a technology for preventing the growth of lithium dendrites should be necessarily secured.

DETAILED DESCRIPTION OF THE INVENTION

Technical Problem

It is an object of the present invention to provide a separator capable of preventing a short circuit of cells due to the growth of lithium dendrites, and a lithium secondary battery including the same.

Technical Solution

In order to achieve the object, the present invention provides a separator including a porous coating layer and nonconductive layers formed on both sides of the porous coating layer, wherein the porous coating layer includes inorganic particles in which oxidation and reduction reactions do not occur in the operating voltage range of a battery, a polymer binder, and additives that occlude lithium ions and are reduced in the region of greater than 0 V and 5 V or less, compared to lithium, and the additives are one or more selected from the group consisting of compounds represented by $TiO_2$, $Li_4Ti_5O_{12}$, and $Li_xM_yO_z$ (wherein M=V, Cr, Mn, Zr, Nb, Mo, or Ru, $0 \leq x \leq 1$, $0 < y \leq 2$, and $0 < z \leq 3$).

The additives may be $TiO_2$ or $Li_4Ti_5O_{12}$.

The additives may be included in the content of 1 to 10 wt %, based on the total weight of the porous coating layer.

The average particle diameter of the additives may be 0.001 to 10 μm.

The volume of the additives after reduction may be 100 to 150% of the volume before reduction.

The porosity of the porous coating layer may be 30 to 50%.

The nonconductive layer may include a polymer and/or inorganic material which do not have oxidation or reduction reactivity in the region greater than 0 V and 5 V or less, compared to lithium, and are electrically nonconductive.

The nonconductive layer may include a porous membrane or a non-woven fabric formed of one or more polymers selected from the group consisting of polyolefin, polyethylene terephthalate, polybutylene terephthalate, polyester, polyacetal, polyamide, polycarbonate, polyimide, polyetheretherketone, polyether sulfone, polyphenylene oxide, polyphenylene sulfide, and polyethylene naphthalate.

The inorganic particles may be $BaTiO_3$, $Pb(Zr,Ti)O_3$ (PZT), $Pb_{1-x}La_xZr_{1-y}Ti_yO_3$(PLZT), $Pb(Mg_{1/3}Nb_{2/3})O_3$—$PbTiO_3$(PMN-PT), hafnia ($HfO_2$), $SrTiO_3$, $SiO_2$, $SnO_2$, $CeO_2$, MgO, NiO, CaO, ZnO, $ZrO_2$, $Y_2O_3$, $Al_2O_3$, SiC, or a mixture thereof.

The thickness ratio of the porous coating layer and the nonconductive layer may be 1:10 or less.

Further, the present invention provides a lithium secondary battery including: a positive electrode; a negative electrode; and a separator and an electrolyte interposed between the positive electrode and the negative electrode, wherein the separator is the above-explained separator of the present invention.

Effect of the Invention

The separator of the present invention can inhibit the growth of lithium dendrites, thereby preventing cell short circuit, and thus can improve the life cycle characteristic and stability of a battery.

DETAILED DESCRIPTION OF THE EMBODIMENTS

The terms used herein are only to explain specific embodiments, and are not intended to limit the present invention. A singular expression includes a plural expression thereof, unless it is expressly stated or obvious from the context that such is not intended. As used herein, the terms "comprise", "equipped", "have", etc. are intended to designate the existence of practiced characteristic, number, step, constructional element, or combinations thereof, and they are not intended to preclude the possibility of existence or addition of one or more other characteristics, numbers, steps, constructional elements, or combinations thereof.

Although various modifications can be made to the present invention and the present invention may have various forms, specific examples will be illustrated and explained in detail below. However, it should be understood that these are not intended to limit the present invention to a specific disclosure, and that the present invention includes all the modifications, equivalents, or replacements thereof without departing from the spirit and technical scope of the invention.

Hereinafter, the present invention will be explained in detail.

The present invention relates to a separator including a porous coating layer and nonconductive layers formed on both sides of the porous coating layer, wherein the porous coating layer includes inorganic particles in which oxidation and reduction reactions do not occur in the operating voltage range of a battery, a polymer binder, and additives that occlude lithium ions and are reduced in a region greater than 0 V and 5 V or less, compared to lithium, and the additives are one or more selected from the group consisting of compounds represented by $TiO_2$, $Li_4Ti_5O_{12}$, and $Li_xM_yO_z$ (wherein M=V, Cr, Mn, Zr, Nb, Mo, or Ru, $0 \leq x \leq 1$, $0 < y \leq 2$, and $0 < z \leq 3$).

Since the separator can effectively inhibit the growth of lithium dendrites, thereby preventing short circuit and ignition of cells induced by lithium dendrites, it can significantly contribute to the stability of a lithium secondary battery.

In the separator of the present invention, the additives included in the porous coating layer perform a function of reacting with lithium dendrites grown from a lithium metal electrode during the operation of a battery, thus inhibiting the growth of the lithium dendrites. Namely, the additives are reduced while oxidizing lithium metal into lithium ions, thereby preventing lithium dendrites from continuously growing. Particularly, since the separator of the present invention includes a nonconductive layer contacting both sides of the porous coating layer, and thus a negative electrode and a positive electrode may be physically separated from the porous coating layer, the additives of the porous coating layer may not be activated while lithium dendrites do not grow, and thus there is no concern about self discharge in the operation of a common battery, and there is no concern that the additives may be reduced by the negative electrode and inactivated.

The additives are not specifically limited as long as they are not dissolved in the electrolyte, and occlude lithium ions and are reduced in the region of greater than 0 V to 5 V or less, compared to lithium, but specifically, one or more materials selected from the group consisting of compounds represented by $TiO_2$, $Li_4Ti_5O_{12}$, and $Li_xM_yO_z$ (wherein M=V, Cr, Mn, Zr, Nb, Mo, or Ru, $0 \leq x \leq 1$, $0 < y \leq 2$, and $0 < z \leq 3$) may be used. As the M, Zr and Nb may be more preferable. Among them, $TiO_2$ and $Li_4Ti_5O_{12}$ (represented by $Li(Li_{1/3}Ti_{5/3})O_4$ or $Li_1Ti_{5/4}O_3$) may be more preferably used because they have very small volume change to about 104% or less when occluding lithium, and are relatively inexpensive, and thus have high economical efficiency.

The amount of the additives used may be appropriately controlled according to the construction of a battery. For example, the additives may be included in the content of 1 to 10 wt %, or 1 to 5 wt %, based on the total weight of the porous coating layer. If the amount of the additives is less than 1 wt % of the porous coating layer, the effect for inhibiting the growth of lithium dendrites may not be sufficiently secured, and if it is greater than 10 wt %, the energy density of a cell may be decreased, and thus it is preferable that the above range is fulfilled.

The average particle diameter of the additives is not specifically limited, but it is preferable that the average particle diameter is in the range of 0.001 to 10 μm, more preferably 0.01 to 10 μm, or 0.01 to 5 μm, so as to secure uniformity of the thickness of the porous coating layer and achieve appropriate porosity. If the average particle diameter of the additives is greater than 100 μm, the thickness of the additive layer becomes excessively thick, thus decreasing the energy density of a cell, and if it is less than 0.001 μm, handling problems may be generated, it may be unfavorable for the formation of pores, and the additives may pass through the pores of a separator and contact a negative electrode or a positive electrode. Herein, the average particle diameter of the additives may be measured using a commonly used particle size analyzer (for example, Zetasizer nano manufactured by Malvern Corporation), and the like.

Meanwhile, it is preferable that the volume change of the additives when occluding lithium ions is small. If the volume change of the additives is large, although the growth of lithium dendrites may be inhibited, expanded additives may block the pores of a separator to inhibit ion transfer, and internal short circuit of cells may be generated due to the additives. Thus, it is preferable that the volume of the additives after reduction is 100 to 150%, more preferably 100 to 120%, or 100 to 105% of the volume before reduction.

The porous coating layer includes a polymer binder together with the additives. The polymer binder uniformly disperses the additives in the porous coating layer, thereby effectively inhibiting the growth of lithium dendrites during the operation of a battery.

The polymer binder may be, for example, one selected from the group consisting of polyvinylidene fluoride (PVDF), polyvinylidene fluoride-co-hexafluoro propylene, polyvinylidene fluoride-co-trichloroethylene, polymethyl methacrylate, polyacrylonitrile, polyvinyl pyrrolidone, polyvinyl acetate, polyethylene-co-vinylacetate, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxyl methyl cellulose, acrylonitrile-styrene-butadiene copolymer and polyimide, or mixtures thereof, but not limited thereto.

It is preferable that the polymer binder is included in the content of 0.1 to 20 wt %, or 0.1 to 10 wt %, based on the total weight of the porous coating layer, so as to prevent deintercalation of the additives, prevent an increase in the internal resistance of a separator, and secure appropriate porosity of a porous coating layer.

In the porous coating layer, the polymer binder is coated on a part or the whole of the surfaces of the additives particles, the additive particles are connected and fixed with each other by the polymer binder while being adhered, interstitial volumes are formed between the additive particles, and the interstitial volumes between the additive particles become empty spaces to form pores.

The porosity of the porous coating layer is preferably 20 to 50%. Herein, the porosity means the volume ratio of the pores to the total volume of the porous coating layer. If the porosity of the porous coating layer is less than 20%, it may be difficult for the electrolyte to be impregnated, and if it is greater than 50%, stability may decrease, and thus it is preferable that the above range of porosity is fulfilled. A method for measuring the porosity of the porous coating layer is not specifically limited, wherein micro and meso pore volumes and the like may be measured using a BET (Brunauer-Emmett-Teller) measurement method using a commonly used adsorption gas such as nitrogen, or the porosity may be measured using a commonly used Hg porosimeter.

Meanwhile, in the present invention, the porous coating layer includes inorganic particles in which oxidation and reduction reactions do not occur in the operating voltage range of a battery (for example, 0 to 5 V, based on Li/Li*). The inorganic particles are included in the content of 70 to 90 wt %, or 80 to 90 wt %, of the porous coating layer. The inorganic particles perform functions for supporting the additives and improving stability in the porous coating layer, and the kinds are not specifically limited as long as they are electrically stable in the operating voltage range of a battery, but for example, $BaTiO_3$, $Pb(Zr,Ti)O_3(PZT)$, $Pb_{1-x}La_xZr_{1-y}Ti_yO_3(PLZT)$, $Pb(Mg_{1/3}Nb_{2/3})O_3$—$PbTiO_3(PMN-PT)$, hafnia($HfO_2$), $SrTiO_3$, $SiO_2$, $SnO_2$, $CeO_2$, MgO, NiO, CaO, ZnO, $ZrO_2$, $Y_2O_3$, $Al_2O_3$, SiC, or mixtures thereof may be used, and preferably, $Al_2O_3$, $SiO_2$, or mixtures thereof may be used.

In the present invention, although the thickness of the porous coating layer is not specifically limited, it may be preferable that the thickness is in the range of 0.01 μm to 50 μm, or 0.5 μm to 20 μm, so as to prevent an increase in the internal resistance of a battery and secure stability.

Since the above-explained porous coating layer includes additives that occlude lithium ions and are reduced, it can effectively prevent the growth of lithium dendrites. However, if the porous coating layer is in direct contact with a negative layer, the additives may be reduced beforehand to lose the activity for inhibiting the growth of lithium dendrites, and may induce self discharge. Thus, in order to protect both sides of the porous coating layer and prevent unnecessary consumption of lithium due to self discharge, the separator of the present invention includes nonconductive layers on both sides of the porous coating layer.

The nonconductive layer is a layer including a polymer and/or an inorganic material which do not have oxidation or reduction reactivity in the region greater than 0 V to 5 V or less, based on lithium, and are electrically nonconductive, and those commonly used in a porous substrate in a lithium secondary battery may be used without limitations.

Specifically, the nonconductive layer may include a porous membrane or non-woven fabric formed of one or more polymers selected from the group consisting of polyolefin, polyethylene terephthalate, polybutylene terephthalate, polyester, polyacetal, polyamide, polycarbonate, polyimide, polyetheretherketone, polyether sulfone, polyphenylene oxide, polyphenylene sulfide, and polyethylene naphthalate. Among them, it is preferable in terms of commercial potential to use a porous membrane or non-woven fabric formed of one or more polymers selected from the group consisting of polyethylene and polypropylene.

Meanwhile, as the electrically nonconductive inorganic material, the same material as the above-explained inorganic particles of the porous coating layer may be used, but it is not limited thereto. Such inorganic material may be coated on the above-explained polymer porous membrane or non-woven fabric to form a nonconductive layer.

The nonconductive layer is a porous layer, and the porosity is not specifically limited, but may be in the range of 10 to 95%. Further, the thickness of the nonconductive layer may be appropriately controlled, but for example, it may be in the range of 1 μm to 100 μm, or 5 μm to 50 μm.

In order secure the effects of the present invention, it is preferable that the thickness ratio of the porous coating layer and the nonconductive layer is 1:10 or less, for example, 1:1 to 1:5.

That is, the separator of the present invention has a structure wherein both sides of a porous coating layer are covered with nonconductive layers of equal thicknesses, and thereby the porous coating layer including an additive capable of occluding lithium ions are not in direct contact with a positive layer and a negative layer, thus preventing unnecessary consumption of lithium due to self discharge.

Meanwhile, the nonconductive layer may be used in a multilayered structure, and in this case, each layer may have different compositions and/or properties. For example, as a first nonconductive layer being in direct contact with the porous coating layer, a polyethylene non-woven fabric with porosity of 30% may be used, and in order to improve the stability of a cell and adhesion between the separator and electrodes, a second nonconductive layer including an $Al_2O_3$ inorganic material and PVDF binder and having porosity of 25% may be laminated thereto. As such, in case the first and second nonconductive layers are made different, the stability of a cell may be further improved while securing lithium ion conductivity.

A method for preparing the above-explained separator of the present invention is not specifically limited, but for example, it may be prepared by coating a solution for preparing a porous coating layer between 2 nonconductive layers, and drying the same, and it will be further embodied by the examples described below.

Meanwhile, the present invention provides a lithium secondary battery including the above-explained separator. For the construction of the positive electrode, negative electrode, and electrolyte of the lithium secondary battery, those used in common lithium secondary batteries may be used without limitations.

In the present invention, the positive electrode includes a positive electrode current collector and a positive electrode mixture.

The positive electrode current collector, like a negative electrode current collector, is not specifically limited as long as it has high conductivity without inducing chemical change in a battery, and for example, stainless steel, aluminum, nickel, titanium, baked carbon, or aluminum or stainless steel surface-treated with carbon, nickel, titanium, silver, and the like may be used. The positive electrode current collector may have various forms such as a film having minute unevenness on the surface, a sheet, a foil, a net, a porous body, a foam body, a non-woven fabric, and the like. For example, as the positive electrode current collector, an aluminum sheet may be used, but is not limited thereto.

The positive electrode mixture formed on the positive electrode current collector includes the positive electrode active material, and in addition, it may further include a conductive material, a binder, and the like.

The positive electrode active material that can be used in the lithium secondary battery of the present invention is not specifically limited, and positive electrode active materials commonly used in a lithium secondary battery may be appropriately used. For example, the positive electrode active material may be lithium-containing transition metal oxide, and specifically, may be one or more selected from the group consisting of $Li_xCoO_2$ (0.5<x<1.3), $Li_xNiO_2$ (0.5<x<1.3), $Li_xMnO_2$ (0.5<x<1.3), $Li_xMn_2O_4$ (0.5<x<1.3), $Li_x(Ni_aCo_bMn_c)O_2$ (0.5<x<1.3, 0<a<1, 0<b<1, 0<c<1, a+b+c=1), $Li_xN_{1-y}Co_yO_2$ (0.5<x<1.3, 0<y<1), $Li_xCo_{1-y}Mn_yO_2$ (0.5<x<1.3, 0≤y<1), $Li_xNi_{1-y}Mn_yO_2$ (0.5<x<1.3, O≤y<1), $Li_x(Ni_aCo_bMn_c)O_4$ (0.5<x<1.3, 0<a<2, 0<b<2, 0<c<2, a+b+c=2), $Li_xMn_{2-z}Ni_zO_4$ (0.5<x<1.3, 0<z<2), $Li_xMn_{2-z}Co_zO_4$ (0.5<x<1.3, 0<z<2), $Li_xCoPO_4$ (0.5<x<1.3) and $Li_xFePO_4$ (0.5<x<1.3), but it is not limited thereto. The lithium-containing transition metal oxide may be coated with a metal such as aluminum (Al) or a metal oxide. Further, in addition to the lithium-containing transition metal oxide, a sulfide, a selenide, a halide, and the like may be used.

The positive electrode mixture may include binder resin for binding of electrode active material and conductive material, and binding to a current collector. As non-limiting examples of the binder resin, polyvinylidene fluoride (PVDF), polyvinyl alcohol (PVA), polyacrylic acid (PAA), polymethacrylic acid (PMA), polymethyl methacrylate (PMMA), polyacrylamide (PAM), polymethacrylamide, polyacrylonitrile (PAN), polymethacrylonitrile, polyimide (PI), alginic acid, alginate, chitosan, carboxymethyl cellulose (CMC), starch, hydroxypropyl cellulose, regenerated cellulose, polyvinyl pyrrolidone, tetrafluoroethylene, polyethylene, polypropylene, an ethylene-propylene-diene polymer (EPDM), sulfonated-EPDM, styrene-butadiene rubber (SBR), fluororubber, and various copolymers thereof may be mentioned.

Further, the positive electrode mixture may include the above-explained conductive material so as to further improve the conductivity of the active material, and it may further include other additives commonly used in a positive electrode mixture such as fillers and the like, in a range within which the effects of the present invention are not hindered.

The positive electrode of the present invention may be prepared by a common method for preparing a positive electrode, and specifically, it may be prepared by coating a composition for forming a positive electrode active material that is prepared by mixing a positive electrode active material, a conductive material, and a binder in an organic solvent, on a current collector, and drying it, and optionally progressing compression molding so as to improve electrode density. Herein, it is preferable to use organic solvents that can uniformly disperse the positive electrode active material, the binder, and the conductive material, and are easily evaporated. Specifically, N-methylpyrrolidone, acetonitrile, methanol, ethanol, tetrahydrofuran, water, isopropyl alcohol, and the like may be mentioned, but the solvent is not limited thereto.

In addition, the negative electrode includes a lithium metal active material layer formed on a negative electrode current collector, wherein the negative electrode current collector is not specifically limited as long as it has conductivity without inducing a chemical change in a battery, and for example, copper, stainless steel, aluminum, nickel, titanium, baked carbon, copper or stainless steel surface-treated with carbon, nickel, titanium, silver, and the like, an aluminum-cadmium alloy, and the like may be used.

In the lithium secondary battery of the present invention, as the electrolyte, those commonly used in a lithium secondary battery, namely, an electrolyte solution including lithium salts and a non-aqueous organic solvent, an organic solid electrolyte, an inorganic solid electrolyte, and the like may be used.

As the non-aqueous organic solvent, for example, aprotic organic solvents such as N-methyl-2-pyrrolidone, propylene carbonate, ethylene carbonate, butylenes carbonate, dimethyl carbonate, diethyl carbonate, ethyl methyl carbonate, gamma-butyrolactone, 1,2-dimethoxyethane, 1,2-diethoxy ethane, tetrahydroxy franc, 2-methyl tetrahydrofuran, dimethyl sulfoxide, 1,3-dioxolane, 4-methyl-1,3-dioxene, diethylether, formamide, dimethyl formamide, dioxolane, acetonitrile, nitromethane, methyl formate, methyl acetate, phosphate trimester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, and the like may be used.

The lithium salt is material that is easily dissolved in the non-aqueous electrolyte, and for example, LiCl, LiBr, LiI, $LiClO_4$, $LiBF_4$, $LiB_{10}Cl_{10}$, $LiPF_6$, $LiAsF_6$, $LiSbF_6$, $LiAlCl_4$, LiSCN, $LiC_4BO_8$, $LiCF_3CO_2$, $LiCH_3SO_3$, $LiCF_3SO_3$, $LiN(SO_2CF_3)_2$, $LiN(SO_2C_2F_5)_2$, $LiC_4F_9SO_3$, $LiC(CF_3SO_2)_3$, chloroborane lithium, a lower aliphatic lithium carboxylate, 4 phenyl borate lithium imide, and the like may be used.

As the organic solid electrolyte, for example, polyethylene derivatives, polyethylene oxide derivatives, polypropylene derivatives, phosphate ester polymer, poly agitation lysine, polyester sulfide, polyvinyl alcohol, polyfluorovinylidene, a polymer including secondarily dissociable groups, and the like may be used.

As the inorganic solid electrolyte, for example, a nitride, a halogenide, a sulfate of Li, such as $Li_3N$, LiI, $Li_5NI_2$, $L_3N$—LiI—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$—$Li_2S$—$SiS_2$, and the like, may be used.

Further, the electrolyte may further include other additives so as to improve the charge discharge property, flame resistance, and the like. As examples of the additives, pyridine, triethyl phosphate, triethanolamine, cyclic ether, ethylene diamine, n-gylme, hexaphosphate triamide, nitrobenzene derivatives, sulfur, quinine imine dye, N-substituted oxazolidinone, N,N-substituted imidazolidine, ethylene glycol dialkyl ether, ammonium salt, pyrrole, 2-methoxy ethanol, aluminum trichloride, fluoroethylene carbonate (FEC), propene sultone (PRS), vinylene carbonate (VC), and the like may be mentioned.

The shape of the above-explained lithium secondary battery is not specifically limited, and for example, it may be a jelly-roll type, a stack type, a stack-folding type (including a stack-Z-folding type), or a lamination-stack type, and preferably, it may be a stack-folding type.

A method for preparing the lithium secondary battery of the present invention is not specifically limited, but for example, it may be prepared by preparing an electrode assembly including a sequentially laminated positive electrode, separator, and negative electrode and then putting it in a battery case, and introducing an electrolyte into the top of the case, and sealing it with a cap plate and a gasket to complete assembly.

Hereinafter, preferable examples will be presented for better understanding of the present invention, but the following examples are presented only as illustrations of the present invention, and it is obvious to one of ordinary knowledge in the art that various alterations and modifications can be made within the categories and technical ideas of the present invention, and such alterations and modifications pertain to the scope of the claims attached hereto.

EXAMPLES

Using a porous polyethylene non-woven fabric of a 7 μm thickness as a nonconductive layer, and using compositions for forming a porous coating layer with the compositions of the following Table 1, separators of examples and comparative examples were manufactured.

Examples 1 and 2 and Comparative Examples 1 to 3

A composition for forming a porous coating layer with the composition of the following Table 1 was coated between 2 sheets of polyethylene nonwoven fabric to a thickness of 5

μm, and dried at 80° C., to manufacture a separator wherein a porous coating layer is interposed between nonconductive layers.

Comparative Examples 4 and 5

On both sides of one sheet of a polyethylene nonwoven fabric, a composition for forming a porous coating layer with the composition of the following Table 1 was coated respectively to a thickness of 2.5 μm, and dried at 80° C., to manufacture a separator wherein porous coating layers are formed on both sides of a nonconductive layer.

Comparative Example 6

A porous polyethylene nonwoven fabric without a porous coating layer was designated as the separator of Comparative Example 6.

TABLE 1

| | Additives | | Composition of compositions for forming a porous coating layer (g) | | | | Thickness of separator after drying (μm) | Porosity of coating layer after drying (%) |
|---|---|---|---|---|---|---|---|---|
| | Kind (particle diameter) | Weight %* | Additives | $Al_2O_3$ | PVdF | NMP | | |
| Example 1 | $TiO_2$ (1 μm) | 3 | 0.9 | 26.1 | 3.0 | 60.0 | 18.3 | 28 |
| Example 2 | $Li_4Ti_5O_{12}$ (0.5 μm) | 5 | 1.5 | 25.5 | 3.0 | 60.0 | 18.6 | 25 |
| Comparative Example 1 | Si (0.7 μm) | 5 | 1.5 | 25.5 | 3.0 | 60.0 | 19.1 | 27 |
| Comparative Example 2 | $Li_7Ti_5O_{12}$ (0.5 μm) | 5 | 1.5 | 25.5 | 3.0 | 60.0 | 19.0 | 28 |
| Comparative Example 3 and Comparative Example 4 | — | — | 0 | 27.0 | 3.0 | 60.0 | Comparative Example 3: 18.8 Comparative Example 4: 12.8 | Comparative Example 3: 32 Comparative Example 4: 30 |
| Comparative Example 5 | $Li_4Ti_5O_{12}$ (0.5 μm) | 5 | 1.5 | 25.5 | 3.0 | 60.0 | 13.0 | 32 |

*wt % of additives based on the total weight of porous coating layer

Experimental Example 1

Lithium symmetric cells were manufactured using a lithium metal electrode (a lithium metal layer of 300 μm laminated on a copper foil of 10 μm) as a positive electrode and a negative electrode, and using the separators prepared according to Examples 1 and 2 and Comparative Examples 1 to 5, and the stabilities of the separators to the growth of lithium dendrites were evaluated. Herein, as the electrolyte, a non-aqueous electrolyte including 1.0 M $LiPF_6$ added to a solvent mixture of 3:7 (volume ratio) of ethylene carbonate (EC) and ethyl methyl carbonate (EMC) was used.

A current density of 1 $mA/cm^2$ was applied to conduct charge/discharge with capacity cut-off of 5 $mAh/cm^2$, and then the cycle at which charge/discharge was finished due to an internal short circuit is as shown in the following Table 2.

TABLE 2

| | Additives | | Structure | Cycle at which internal short circuit of lithium metal symmetric cell is generated |
|---|---|---|---|---|
| | Kind | wt %* | | |
| Example 1 | $TiO_2$ | 3 | nonconductive layer (B)/ porous coating layer (A)/ nonconductive layer (B) | 252 |
| Example 2 | $Li_4Ti_5O_{12}$ | 5 | Same as above (B-A-B) | 305 |
| Comparative Example 1 | Si | 5 | Same as above (B-A-B) | 116 |
| Comparative Example 2 | $Li_7Ti_5O_{12}$ | 5 | Same as above (B-A-B) | 88 |
| Comparative Example 3 | — | — | Same as above (B-A-B) | 97 |
| Comparative Example 4 | — | — | porous coating layer (A)/ nonconductive layer (B)/ porous coating layer (A) | 146 |
| Comparative Example 5 | $Li_4Ti_5O_{12}$ | 5 | Same as above (A-B-A) | 102 |
| Comparative Example 6 | — | — | nonconductive layer (No porous coating layer) | 62 |

*wt % of additives based on the total weight of porous coating layer

Referring to Table 1, it can be confirmed that in the case of Examples 1 and 2, compared to Comparative Example 6 without a porous coating layer or Comparative Examples 3 and 4 wherein additives do not exist in the porous coating layer, internal short circuit due to lithium dendrites was inhibited, and thus life cycle performance was remarkably increased. Further, even compared to Comparative Example 1 wherein additives (Si, the volume after reduction is about 300% of the volume before reduction) having large volume expansion during the occlusion of lithium was used, the life cycle performance of Examples 1 and 2 were remarkably improved. It is considered that the structures of the separators were stably maintained because the volume expansions of $TiO_2$ and $Li_4Ti_5O_{12}$ additives are small.

Meanwhile, Comparative Example 2 using additives such as $Li_7Ti_5O_{12}$ in which all lithium ions are occluded, exhibited similar performance to Comparative Example 3. Thus, it can be confirmed that, from the additives in which all lithium ions are occluded and cannot be further reduced, the effect for preventing the growth of lithium dendrites may not be obtained.

In addition, referring to Comparative Example 5, it can be confirmed that in case a porous coating layer including additives is exposed outside of a separator, the effect for improving the life cycle characteristic of a battery may not be secured. Since the additives exposed outside of a separator are in direct contact with a lithium electrode and are reduced from the time of cell assembly, they lose activities for inhibiting the growth of lithium dendrites, like Comparative Example 2.

Experimental Example 2

97.5 wt % of $LNi_{0.8}Co_{0.1}Mn_{0.1}O_2$ as a positive electrode active material, 1.0 wt % of carbon black as a conductive material, and 1.5 wt % of PVDF as a binder were added to N-methyl-2-pyrrolidone (NMP) to prepare a positive electrode active material slurry. On one side of an aluminum current collector, the above-prepared positive electrode active material slurry was coated to a thickness of 67 μm, and it was dried and rolled and then punched to a certain size to prepare a positive electrode.

Using a lithium metal electrode (a lithium metal layer of 20 μm laminated on a copper foil of 10 μm) as a negative electrode, and using the separators prepared according to Examples 1 and 2 and Comparative Examples 1 to 4, lithium metal ion batteries were manufactured, and the life cycle performance according to the separators was evaluated. Herein, as an electrolyte, a non-aqueous electrolyte including 1.0 M $LiPF_6$ added to a solvent mixture at 3:7 (volume ratio) of ethylene carbonate (EC) and ethyl methyl carbonate (EMC) was used.

After conducting 100 cycles at a 0.3 C charge and a 0.5 C discharge in the region of 3 V~4.25 V, discharge capacity retention after the $100^{th}$ cycle compared to the $1^{st}$ discharge capacity was calculated, and the results are shown in the following Table 3.

TABLE 3

| | Additives | | | Capacity retention after |
|---|---|---|---|---|
| | Kind | wt %* | Structure | $100^{th}$ cycle (%) |
| Example 1 | $TiO_2$ | 3 | nonconductive layer (B)/ porous coating layer (A)/ nonconductive layer (B) | 68.8 |
| Example 2 | $Li_4Ti_5O_{12}$ | 5 | Same as above (B-A-B) | 70.5 |
| Comparative Example 1 | Si | 5 | Same as above (B-A-B) | 51.3 |
| Comparative Example 2 | $Li_7Ti_5O_{12}$ | 5 | Same as above (B-A-B) | 44.0 |
| Comparative Example 3 | — | — | Same as above (B-A-B) | 42.7 |
| Comparative Example 4 | — | — | porous coating layer (A)/ nonconductive layer (B)/ porous coating layer (A) | 56.2 |
| Comparative Example 5 | $Li_4Ti_5O_{12}$ | 5 | Same as above (A-B-A) | 35.5 |
| Comparative Example 6 | — | — | nonconductive layer (no porous coating layer) | 32.1 |

*wt % of additives based on the total weight of porous coating layer

As can be seen from Table 3, it is confirmed that in the case of Examples 1 and 2, the additives of the separator inhibit the growth of lithium dendrites, thus remarkably improving the life cycle characteristics, compared to Comparative Examples 3, 4, and 6 without additives. Further, it is confirmed that Examples 1 and 2 have remarkably excellent life cycle characteristics, even compared to Comparative Example 1 using additives of which volume is significantly expanded according to the occlusion of lithium, Comparative Example 2 using additives that do not have lithium occlusion activity, and Comparative Example 5 in which the activity of the additives are lost due to the structure of the separator wherein the additives are exposed.

The invention claimed is:

1. A separator comprising a porous coating layer and nonconductive layers directly disposed on both sides of the porous coating layer,
    wherein the porous coating layer is interposed between the nonconductive layers, the porous coating layer comprises inorganic particles in which oxidation and reduction reactions do not occur within an operating voltage range of a battery, a polymer binder, and an additive that occludes lithium ions in a range of greater than 0 V and 5 V or less compared to lithium so that the additive is reduced, and
    the additive includes $Li_4Ti_5O_{12}$ or $Li_xM_yO_z$, wherein M is V, Cr, Mn, Zr, Nb, Mo, or Ru, $0 \leq x \leq 1$, $0 < y \leq 2$, and $0 < z \leq 3$ and
    only the porous coating layer is interposed between the nonconductive layers, and
    wherein a content of the additive is 1 to 5 wt % based on a total weight of the porous coating layer.

2. The separator according to claim 1, wherein the content of the additive is 3 to 5 wt % based on a total weight of the porous coating layer.

3. The separator according to claim 1, wherein the additive includes $Li_4Ti_5O_{12}$.

4. The separator according to claim 1, wherein an average particle diameter of the additive is 0.001 to 10 μm.

5. The separator according to claim 1, wherein a volume of the additive after reduction is 100 to 150% of a volume before the reduction.

6. The separator according to claim 1, wherein the additive includes $Li_xM_yO_z$, wherein M is V, Cr, Mn, Zr, Nb, Mo, or Ru, $0 \leq x \leq 1$, $0 < y \leq 2$, and $0 < z \leq 3$.

7. The separator according to claim 1, wherein an average particle diameter of the additive is 0.01 to 10 μm.

8. The separator according to claim 1, wherein an average particle diameter of the additive is 0.01 to 5 μm.

9. The separator according to claim 1, wherein a porosity of the porous coating layer is 30 to 50%.

10. The separator according to claim 1, wherein the inorganic particles include $BaTiO_3$, $Pb(Zr,Ti)O_3$ (PZT), $Pb(Mg_{1/3}Nb_{2/3})O_3$—$PbTiO_3$ (PMN-PT), hafnia ($HfO_2$), $SrTiO_3$, $SiO_2$, $SnO_2$, $CeO_2$, MgO, NiO, CaO, ZnO, $ZrO_2$, $Y_2O_3$, $Al_2O_3$, SiC, or a mixture thereof.

11. The separator according to claim 1, wherein the inorganic particles include $BaTiO_3$, $Pb(Zr,Ti)O_3$ (PZT), $Pb(Mg_{1/3}Nb_{2/3})O_3$—$PbTiO_3$ (PMN-PT), hafnia ($HfO_2$), $SrTiO_3$, $SiO_2$, $SnO_2$, $CeO_2$, MgO, CaO, ZnO, $ZrO_2$, $Y_2O_3$, $Al_2O_3$, SiC, or a mixture thereof.

12. The separator according to claim 1, wherein at least one of the nonconductive layers include a polymer and/or an inorganic material which does not have oxidation or reduction reactivity of greater than 0 V and 5 V or less compared to lithium, and are electrically nonconductive.

13. The separator according to claim 1, wherein at least one of the nonconductive layers includes a porous membrane or a non-woven fabric comprising one or more polymers selected from the group consisting of polyolefin, polyethylene terephthalate, polybutylene terephthalate, polyester, polyacetal, polyamide, polycarbonate, polyimide, polyetheretherketone, polyether sulfone, polyphenylene oxide, polyphenylene sulfide, and polyethylene naphthalate.

14. The separator according to claim 1, wherein a porosity of the nonconductive layer is in a range of 10 to 95%.

15. The separator according to claim 1, wherein a thickness of the nonconductive layer is in a range of 1 μm to 100 μm.

16. The separator according to claim 1, wherein a thickness ratio of the porous coating layer to the nonconductive layer is 1:10 or less.

17. A lithium secondary battery comprising:
a positive electrode;
a negative electrode;
the separator according to claim 1; and
an electrolyte interposed between the positive electrode and the negative electrode.

18. The lithium secondary battery according to claim 17, wherein the porous coating layer is not directly in contact with the positive electrode or the negative electrode.

* * * * *